US006643292B2

(12) United States Patent
Chapman et al.

(10) Patent No.: US 6,643,292 B2
(45) Date of Patent: *Nov. 4, 2003

(54) EFFICIENT PACKET DATA TRANSPORT MECHANISM AND AN INTERFACE THEREFOR

(75) Inventors: Alan Stanley John Chapman, Kanata (CA); Hsiang-Tsung Kung, Lexington, MA (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,888

(22) Filed: Apr. 28, 1998

(65) Prior Publication Data

US 2001/0043609 A1 Nov. 22, 2001

(51) Int. Cl.⁷ .................................. H04L 12/56
(52) U.S. Cl. .................. 370/395.52; 370/401
(58) Field of Search ................... 470/401, 465, 470/466, 469, 474, 471; 370/395.2

(56) References Cited

U.S. PATENT DOCUMENTS

| | | | | |
|---|---|---|---|---|
| 5,535,199 A | * | 7/1996 | Amri et al. | |
| 5,623,605 A | * | 4/1997 | Keshav et al. | 395/200.17 |
| 5,636,371 A | * | 6/1997 | Yu | 395/500 |
| 5,815,516 A | * | 9/1998 | Aaker et al. | 371/53 |
| 5,946,313 A | * | 8/1999 | Allan et al. | 370/397 |
| 6,005,871 A | * | 12/1999 | Petersen et al. | 370/474 |
| 6,016,319 A | * | 1/2000 | Kshirsagar et al. | 370/410 |
| 6,073,178 A | * | 6/2000 | Wong et al. | 709/229 |
| 6,081,507 A | * | 6/2000 | Chao et al. | 370/235 |
| 6,151,318 A | * | 11/2000 | Woodward et al. | 370/392 |

FOREIGN PATENT DOCUMENTS

CA 2253853 4/1997 ........... H04L/12/66

OTHER PUBLICATIONS

"Local and Metropolitan Area Networks," William Stallings, 1997.*
Chapman, A. et al, "Enhancing Transport Networks with Internet Protocols", Online, Mar. 1998, pp. 1–9, XP002185062.

* cited by examiner

Primary Examiner—Kenneth Vanderpuye
(74) Attorney, Agent, or Firm—Shapiro Cohen; Dennis R. Haszko

(57) ABSTRACT

Transport networks are facing new challenges and opportunities because of the explosive growth of data traffic. Besides having to meet the ever increasing bandwidth demand, transport networks need to provide new functionalities for the support of data applications. Novel enhanced transport systems with inherent packet multiplexing to meet these challenges are described. It uses Internet protocols and technologies to implement these packet transport systems, and thereby re-use much of the existing Internet infrastructure already widely deployed.

33 Claims, 6 Drawing Sheets

F: flag a: TCP header length (4 bits)
b: URG (1 bit)
c: ACK (1 bit)
d: PSH (1 bit)
e: RST (1 bit)
f: SYN (1 bit)
g: FIN (1 bit)

EFFICIENT PACKET DATA TRANSPORT MECHANISM AND AN INTERFACE THEREFOR

FIELD OF THE INVENTION

The invention resides generally in the field of digital data transport through a network. In particular, it relates to an apparatus for and method of transporting digital data in streams of TCP packets efficiently between two transport access points of a data transport network.

BACKGROUND OF INVENTION

Transport systems such as the North American SONET networks are arrangements of multiplexers, switches, and transmission links that provide virtual "pipes" between service points. The pipes are administered and relatively static and the complexity of providing them is hidden from the higher layer services. Most of the traffic carried on the transport network is data. The increasing proportion of data traffic will require that the transport systems change to handle data packet flows more efficiently, and also to work well with features of data traffic such as high-level end-system protocols like TCP.

Existing transport systems are circuit-based and have developed as a way of efficiently managing networks based on the time division multiplexing (TDM) voice bandwidth hierarchy. In a TDM transport a circuit is set up between each pair of nodes and each remote node appears as a separate port and traffic can be sent at any time to any remote node. It provides the same fixed bandwidth TDM pipes for reliable delivery of both voice and data. The bandwidth of the physical access link is partitioned to reflect one or more circuits of the committed bandwidths. However, as the bandwidth of these circuits is committed whether it is used or not, there is no flexibility and no opportunity for traffic flows to exploit unused bandwidth of other flows (time slot being permanently assigned). This causes inefficiency for data applications which are inherently bursty. Further more, the TDM hierarchy has a coarse granularity at high bandwidths resulting in under-utilization and yet data flows are unable to exploit the leftover bandwidth of other data pipes. For example, pipes in the current TDM hierarchy are derived from aggregating 64 Kb/s circuits. This granularity becomes coarser as bandwidth increases, typical rates are 1.5 Mb/s, 45 Mb/s, 155 Mb/s, 622 Mb/s, 2.4 Gb/s. Using a 2.4 Gb/s pipe to deliver 1 Gb/s of traffic is inefficient in using network bandwidth.

In contrast, a packet based transport system allows the access bandwidth to be dynamically allocated. Remote nodes can be represented as logical ports but there is no commitment of bandwidth when this is not needed. The physical access link is fully available for traffic to any destination. In a packet transport system, virtual pipes are provided between any two transport access points. These pipes may be guaranteed some minimum rate of transmission but certainly it is required that an access point can make opportunistic use of spare bandwidth. Frame relay as a packet based transport allows more efficient use of bandwidth by permitting statistical multiplexing of data streams, thus allowing to exploit unused bandwidth. However, there is no mechanism (protocol) to ensure reliable delivery of the frames and under congestion conditions frames are discarded and the higher layer protocols must compensate for the loss. The discard of frames is not sensitive to the impact on the higher layer protocols and the frame flows do not directly adapt to the network conditions. ATM with an effective flow control can provide a lossless but dynamic transport. However, it relies on some reasonable level of complexity at the transport switching points to achieve the flow control, the effectiveness of which has not yet been proven in the field. ATM without flow control requires that cells be discarded under congestion conditions and this discard should be aware of packet boundaries and the impact on the higher layer protocol such as TCP protocol. These issues are just beginning to be understood. Because of the perceived inefficiency of ATM for the average data packet lengths, and in environments where the granularity of ATM is not needed, a packet based transport is more efficient.

Another attribute of a packet based transport system is automatic configuration. This is evident in Ethernet, one of the current packet transport systems. In an Ethernet network, new nodes can announce themselves on joining the network. They each have a unique transport (Ethernet) address and no manual configuration is needed. Any node can search for a resource, such as an IP address, using a multicast protocol and get an answer from the node which owns the resource. In this way it is very simple to build tables of associations.

As data traffic becomes the dominant load for transport systems, high efficiency in carrying data is critical. A few percent of efficiency increase can translate into a large cost saving. On the other hand, many data services now demand increased performance guarantees, such as the guaranteed bandwidth that is inherent in the TDM system, while not wanting to depart from the current open usage style of the Internet. This is a problem beyond just IP QoS protocols; transport systems, which after all carry all the traffic, can play an essential role in the total solution.

It is commonly understood in the field of the present invention that a layer under the networking layer is called "transport" layer and provides pipes between networking layer nodes. This is in contrast to the layered model of the OSI (open systems interconnect) in which the transport layer resides upon the network layer which in turn sits on top of the data link layer. The data link layer provides similar functionalities to those of the transport layer of the present description. Throughout the specification, the former designation is used.

Therefore in the TCP/IP model, IP layer resides under TCP layer. The IP layer is the network layer in which IP (Internet protocol) runs and the TCP layer is the transfer layer in which the TCP (transmission control protocol) runs. The TCP has been used for ensuring reliable transfer of byte stream data between two end points over an internetwork which may be less reliable. An internetwork differs from a single network, because different parts may have wildly different topologies, bandwidth, delays, packet sizes, and other parameters. TCP allows adaptive use of available bandwidth and accommodation of different rates at different points in the internetwork or network.

In Internet terminology, aggregating traffic streams by encapsulating them into a single IP stream is often called tunneling. This invention re-uses TCP in a packet based transport to provide TCP tunneling. The use of TCP provides for reliable delivery of data between two transport access points while permitting that transport to offer elasticity and bandwidth sharing. Aggregating traffic streams into TCP tunnels reduces the size of buffers and tables in the transport switches. TCP is well suited to the use of first-in-first-out queues and allows simple implementations at the switching nodes. TCP is also inherently provides for resequencing of out-of-order packets which can occur when switching nodes spread load over multiple links.

OBJECTS OF INVENTION

It is an object of the invention to provide an IP packet based transport network through which one or more TCP connections (tunnels) are established between two transport access points.

It is another object of the invention to provide a technique of one or more connections dynamically sharing the bandwidth of a pipe created between two transport access points.

It is a further object of the invention to provide a method of efficiently transferring customer data between two transport access points through a packet transport network using TCP protocol.

It is yet an object of the invention to provide an interface between a customer equipment and a packet transport network which uses TCP/IP protocol.

SUMMARY OF INVENTION

Briefly stated in accordance with one aspect, the invention is directed to a packet transport network for efficiently transferring customer digital data. The packet transport network comprises a plurality of routing nodes, each having a routing table, for routing transport packets through routing links, and a plurality of transport access interface, each of which has an address table correlating destination of the customer digital data with addresses of transport access interfaces, for connecting one or more customer terminals through a customer access line on one side and to a routing node through a routing link on the other. Each of the transport access interfaces further converts between customer data on the customer access line and transport IP packets on the routing links.

In accordance with another aspect, the invention is directed to an interface for transferring efficiently one or more digital data flows through a packet based transport network from a source transport access point to a destination transport access point. The interface comprises an input module for identifying one or more incoming digital data flows which are destined to the destination transport access point and an address table containing addresses of one or more destination transport access points. The interface further includes an encapsulation module for encapsulating said one or more so identified incoming digital data flows into a stream of transport packets, each transport packet having its own TCP header and transport header, the latter of which identifies the destination transport access point and a transmitter for transmitting the stream of transport packets to the packet based transport network.

According to yet another aspect, the invention is directed to a method of efficiently transferring digital data flows in a packet transport network having at least two transport access interface modules, each of which is connected to one or more customer equipments. The method comprises steps of receiving at a source transport access interface module one or more digital data flows from one or more customer equipments and identifying those digital data flows which are destined to a destination transport access interface module. The method further includes steps of encapsulating said one or more digital data flows in one transport packet stream addressed to said destination transport access interface module and including a TCP header within each transport packet before sending it through the packet transport network.

DETAILED DESCRIPTION OF PREFERRED EMBODIMENTS OF INVENTION

When discussing networks for voice and data in terms of point-to-point links and mesh topologies, it is important to remember that these are logical views. These logical topologies are overlaid on physical transmission systems using multiplexing technologies such as SONET and the logical topology is implemented by configuring cross-connect points in the physical network. A central office in a voice network will see a direct link to its neighbor but that link will actually traverse many multiplexing and switching points in the transport network. Two Internet routers may see themselves as immediate neighbours without having to understand that there is another transport level network, complete with its own management and recovery systems, which provides this logical proximity.

Figure 1:
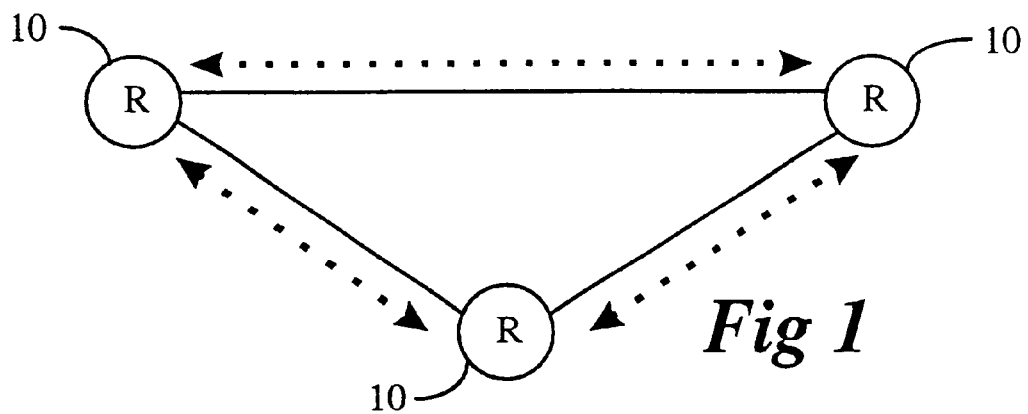
FIG. 1 shows a logical data network.
Figure 2:
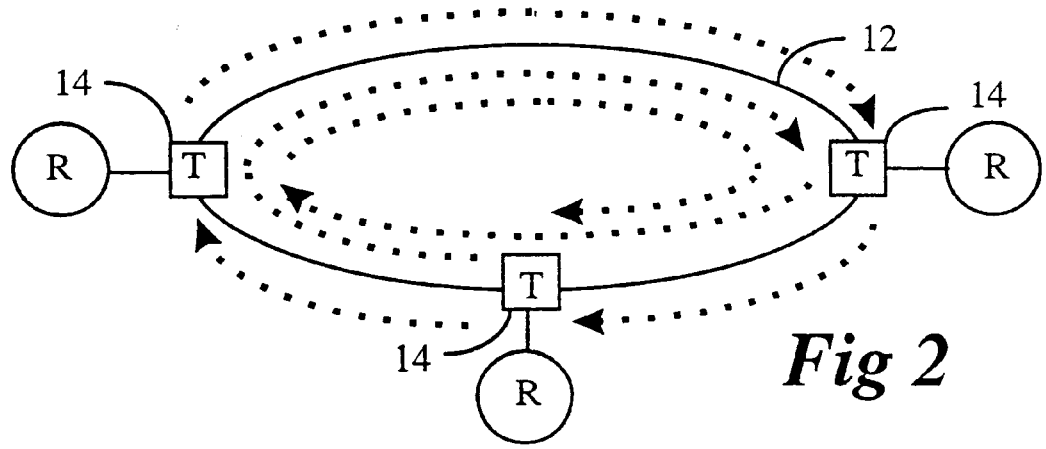
FIG. 2 depicts a logical data network using a ring based transport system.
Figure 3:
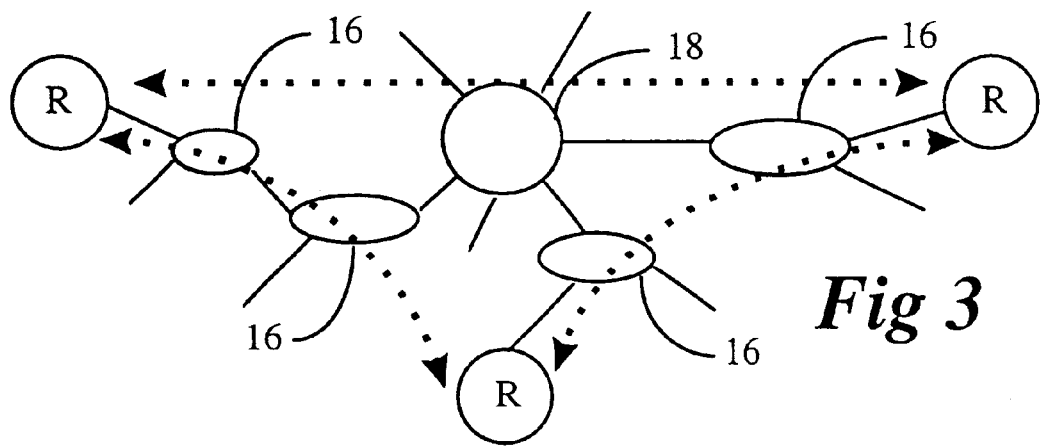
FIG. 3 shows a logical data network realized by a mesh-based transport system.

Referring to FIG. 1, three routers 10, designated R, form a logical data network. As shown in FIG. 2, this logical data network can be achieved by a transport fibre ring 12 with transport nodes 14, designated T, which function as add/drop points. On the other hand, as shown in FIG. 3, a mesh with multiplexers 16 and cross connects 18 can also realizes the logical data network of FIG. 1. In these Figures, paths are shown by dotted lines with arrow heads. Note that, in both the example implementations of FIGS. 2 and 3, paths pass through multiple nodes but if the bandwidth in a path is not being used it can not be made available to other paths passing through the same nodes. This means that links are usually either under utilized or under provisioned. The waste of bandwidth in a circuit cross-connected network is potentially much higher than the ATM cell tax that is more usually discussed.

In a transport network which was designed for packet traffic rather than voice traffic, the switches and multiplexers would be packet-based. In TDM systems the bitstreams from one node to another are steered through the network by pre-configured circuit switches at each multiplexing point. In a packet-based system this steering would be done by inspecting the header of each packet to determine its destination. Customer packets should be encapsulated in transport packets. The addressing scheme for the transport packets must be separate and not visible at the customer level. The encapsulation model must be recursive such that traffic can be aggregated at multiple levels in a similar way as it is in the TDM hierarchy. Instead of pre-configured, fixed-bandwidth circuits there would be a virtual path through the network from any node to any other node based on the destination transport address. No bandwidth resource would be used unless traffic was present.

When providing services with bandwidth guarantees, a packet transport network should be able to emulate the circuit-based mesh in that a defined minimum bandwidth can be allocated between any pair of nodes. However, unused bandwidth should be made available to other flows in a dynamically shared fashion so that a flow can opportunistically exceed its minimum. The guaranteed bandwidth should be allocated at a much more (finer) granular level, than in the TDM networks.

In addition, the transport network must support many customer networks and must provide protection of one customer from the traffic of another. In a circuit-based transport system there is a strong belief in security and isolation between users. The security attributes of the TDM world must be equally demonstrable in the packet-based system.

Figure 4:
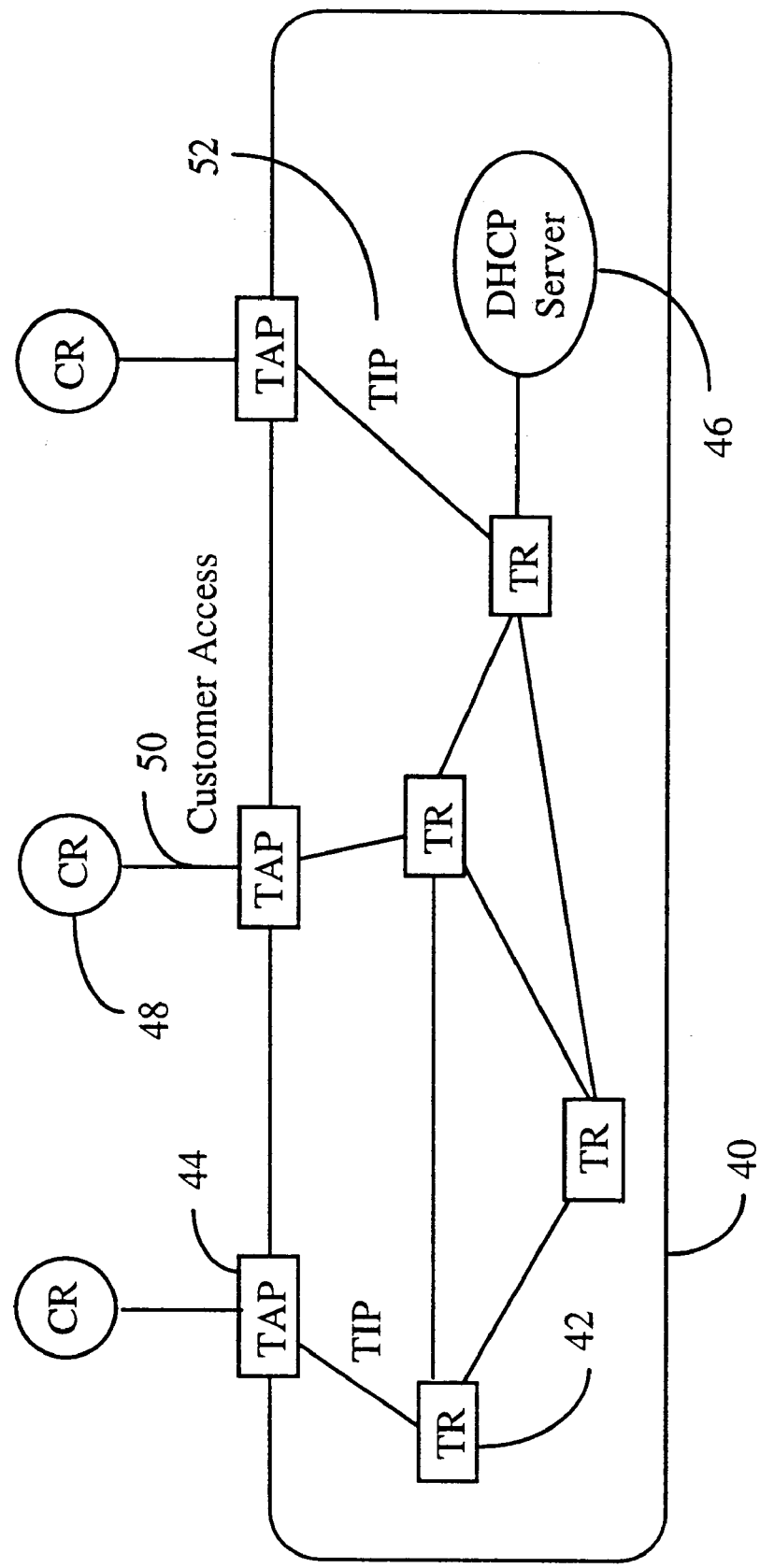
FIG. 4 illustrates a general architecture for an IP-based packet transport network of the invention.

FIG. 4 depicts a general architecture for a novel IP-based packet transport network 40. The network has the following subsystems, transport routers (TR) 42, transport access points (TAP) 44, and a dynamic host configuration protocol (DHCP) server 46. Customer routers or host machines (CR) 48 access to IP transport network 40 through a TAP 44 via a customer access line 50. The functions of these subsystems are as follows:

Transport Routers (TR). These are standard IP routing equipment but are not visible to the customer network. They route transport IP (TIP) packets 52, which encapsulate customer's packets, from one access point to another.

Transport Access Point (TAP). This is the interface between the transport system and the customer router (CR). At this point the customer's packets are encapsulated in one or more TIP packets. The TIP destination address corresponds to the location with the matching destination of the customer's packets. The TAP also implements functions such as policing and control of bandwidth, accounting and TCP trunking which will be described later.

Dynamic Host Configuration Protocol (DHCP) Server. The transport system uses dynamic configuration to provide transport IP addresses for new access points. The TIP address of the access point will be in the routing table of the local transport router (TR) and will thus be propagated through the transport network by standard routing protocols.

Figure 5:
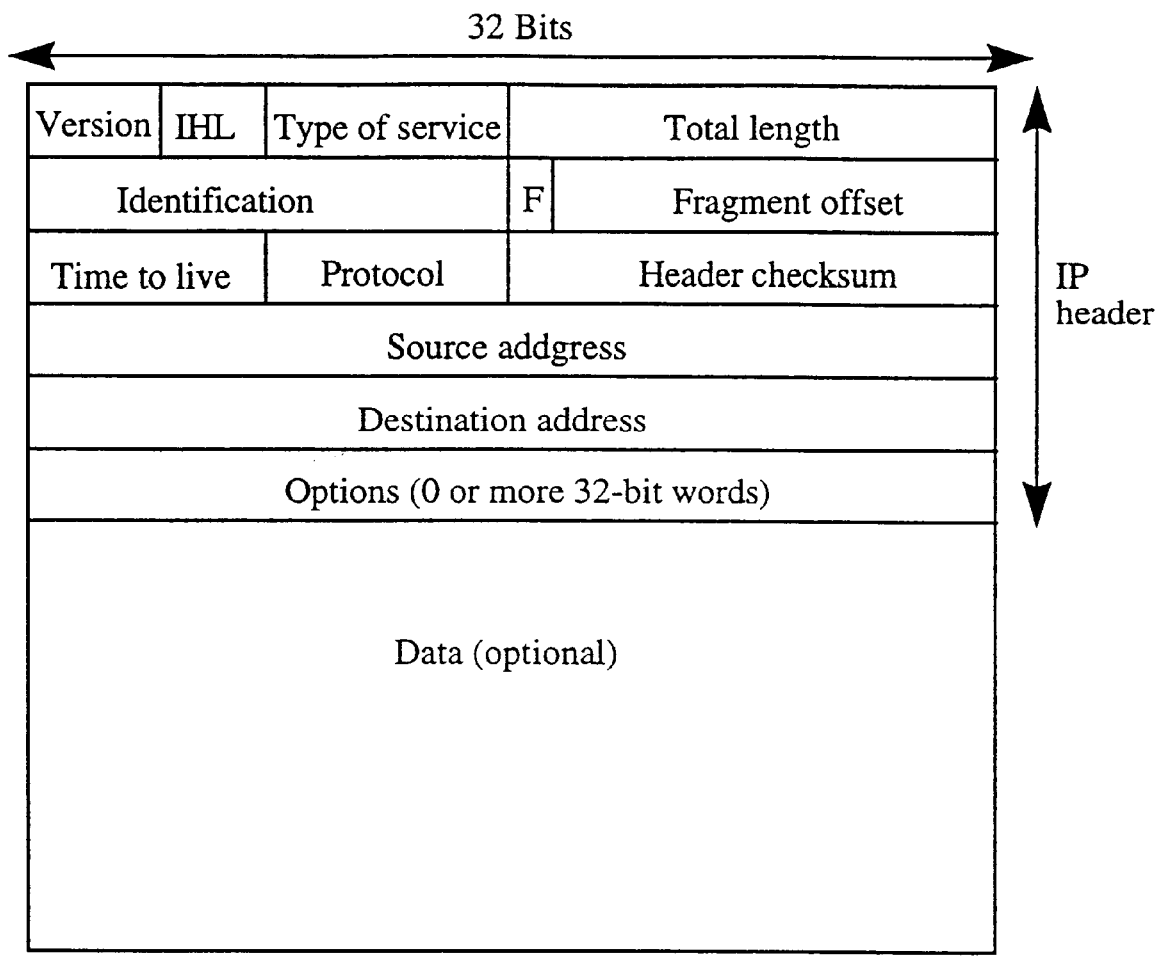
FIG. 5 shows a known IP datagram showing the fields of an IP header.

FIG. 5 shows a known IP datagram format and the fields of an IP header. A TAP encapsulates customer's data and attaches an appropriate IP header. This encapsulated IP packet is a TIP and includes TIP destination and source addresses. Though they are called packets, customer router or host machine generates and sends to a TAP through its access line its data in any packets, frames or TDM formats.

In accordance with one aspect, the IP-based packet transport network shown in FIG. 4 can emulate an Ethernet network among customer's host machines. In this arrangement, where CRs are Ethernet terminals and when a CR 48 sends its data to the transport network 40, the TAP 44 connected to the CR removes the data from its Ethernet frame and encapsulate it in a TIP packet. The TIP destination address corresponds to the location with the matching destination Ethernet address of the Ethernet frame. TIP packets arriving from the transport network are put back into Ethernet frames with the correct source and destination Ethernet addresses. Ethernet multicast frames will be translated into IP multicast packets for that customer's community. Suppose that a CR has a TIP interface instead of an Ethernet interface. Then the cost of translation between Ethernet addresses and the corresponding TIP addresses at the TAP will be alleviated. Replacing from Ethernet interfaces with TIP interfaces is desirable from the view point of IP-based packet transport systems, but would represent a new set of standards for the networking infrastructure.

To the customer's protocols, the transport network is transparent in the sense that it behaves like an Ethernet rather than a routed network. For example, the customer's routing protocols do not involve TRs or TAPs. The customer's TIP packets do not increment their hop counts when journeying over the transport network. This Ethernet model allows the customer to use the transport system with conventional and easy network management methods. When a CR from a new network is attached to the transport network, via configuration the customer can peer it with other CRs already on the system, and run routing protocols such as BGP4 between them to set up their routing tables. The transport network will automatically discover the joining of the CR. That is, the TAP connected to the CR will receive from the CR's interface its Ethernet address, and from the DHCP server a TIP address for the CR to be used by the transport network. Thus, for every customer Ethernet address there is a corresponding TIP address. Via the broadcast feature, the CR will be able to receive ARP-request messages (address resolution protocol-request messages) and respond to them over the transport network, as if it were connected to an Ethernet network.

Figure 6:
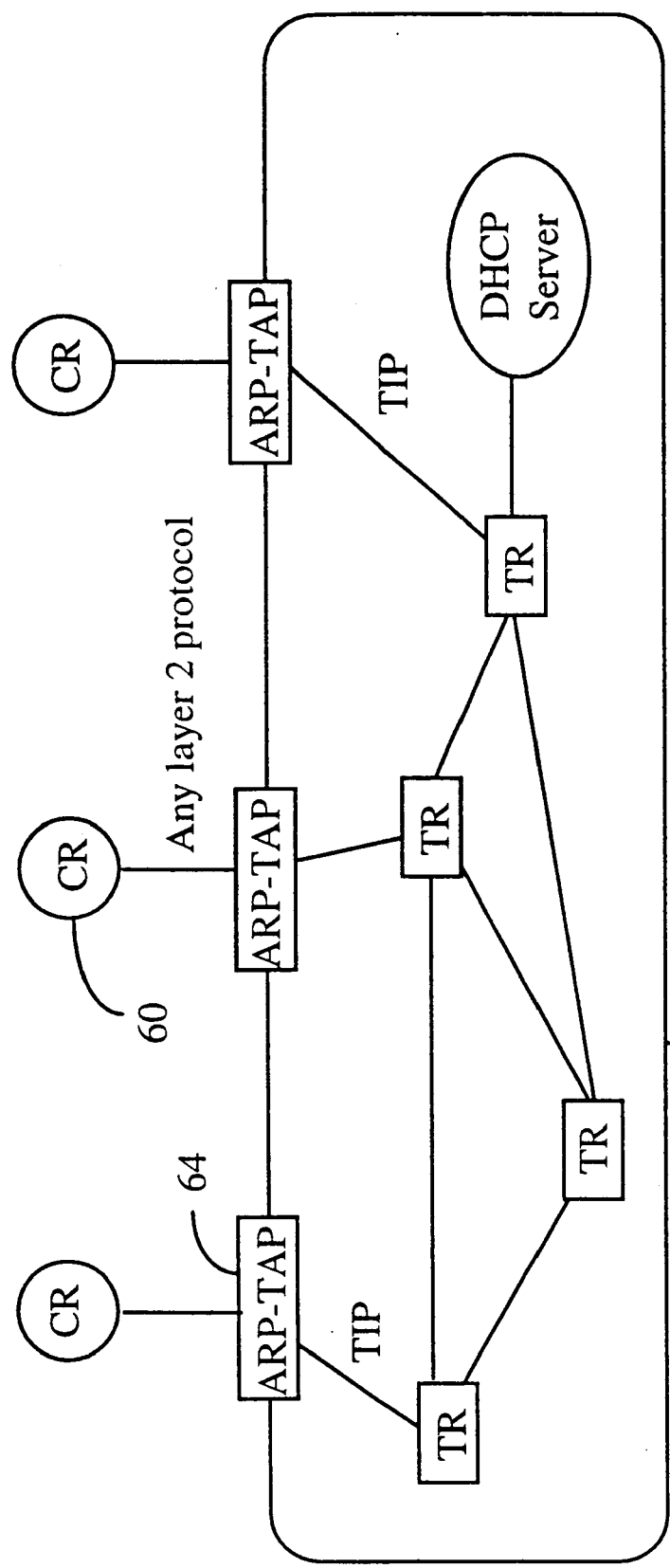
FIG. 6 depicts an IP-based packet transport system with ARP-TAP, according to one embodiment of the invention.

In another arrangement depicted in FIG. 6, CRs 60 can be connected to an IP-based packet transport network 62, using non-Ethernet links. In the Figure, an ARP-TAP 64 which is a TAP capable of performing address resolution protocol, can connect to a CR through a customer link using any layer-2 (Data Link) protocol. At the ARP-TAP, IP packets arriving from the CR are encapsulated into TIP packets, and conversely, TIP packets arriving from the transport network are decapsulated into IP packets. ARP-TAPs will learn the mapping between IP and TIP addresses, in a way similar to how CRs learns the mapping between TIP and Ethernet addresses under the Ethernet model. An advantage of IP is that it has been implemented over a large number of layer-2 links. Use of ARP-TAPs allows the transport network to support all these links while still using the Ethernet model.

A powerful feature of local area networks is multicast and broadcast. A good model for this is Ethernet where broadcast between members of the same community is used to bootstrap up communications to new or previously unknown nodes. Within the transport network customers should be given multicast and broadcast capability for their community.

To accommodate the expected need for differentiated services in data networks, the packet transport network must also provide for guaranteed levels of delay and packet loss. The Resource Reservation Protocol (RSVP) defined for IP networks can be re-used in the packet transport network to allow the set-up of paths with a particular performance over and above best effort. Advances in routing to accommodate quality of service can also be re-used. It should be noted that the transport network will be much less subject to change than the public internet making it simpler to introduce quality of service features.

As described above, in the IP-based packet transport network, all the customer traffic that is going to a destination (one IP address) will be encapsulated in one flow of TIP packets. This reduces the size of tables in the transport routers and the number of contenting connections, but it also has the drawback that it hides the customer flow information that the routers might use to implement intelligent discard policies. The objective of sharing unused bandwidth means that there will be congestion and therefore packet discard at internal routers. Furthermore, it is expected that multiple customer packets might be encapsulated in a single transport packet (TIP packet) to reduce header overheads. The discard of a TIP packet would result in the discard of multiple customer packets. The customer packets may be TCP packets and this discard of customer's TCP packets may potentially cause undesirable effects on the customer's TCP connections.

Figure 7:
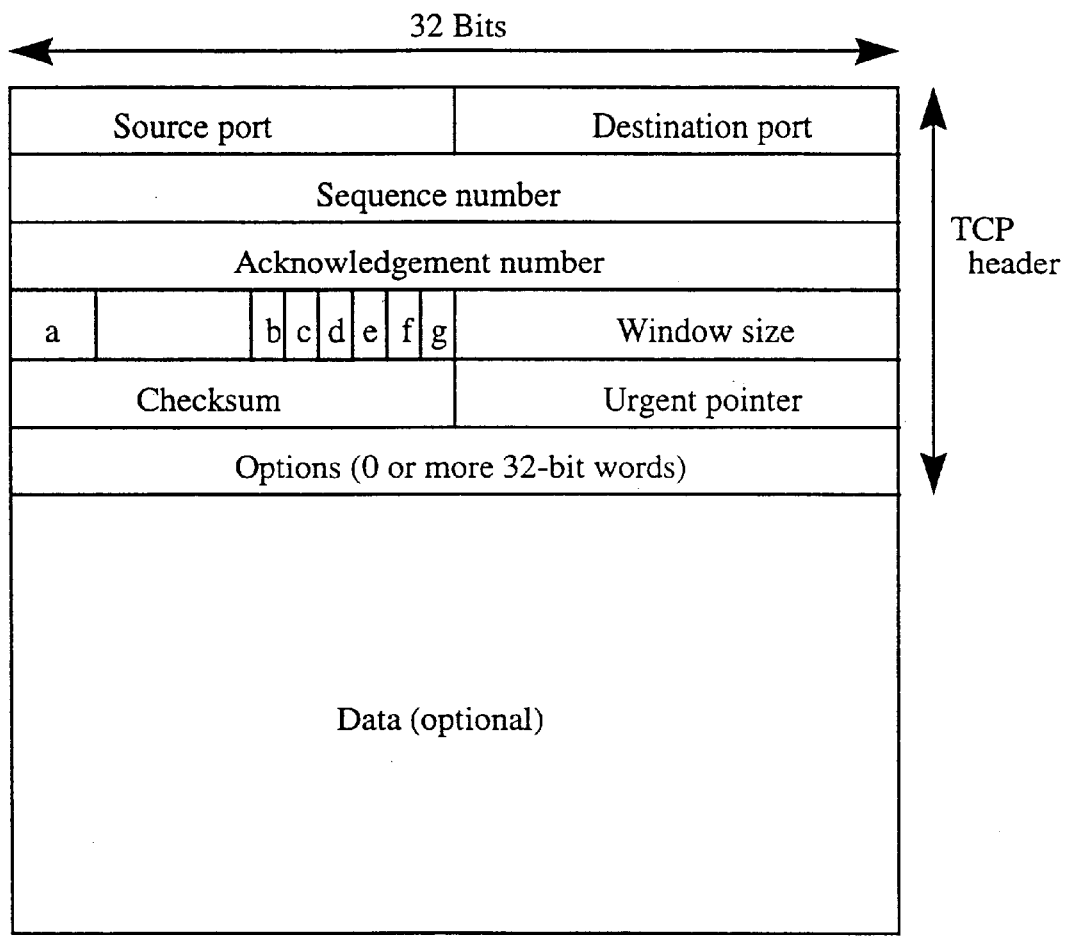
FIG. 7 illustrates a known TCP header.

The conventional IP network which is laid over a circuit-based network implements bandwidth sharing among host machines using the transport control protocol (TCP). FIG. 7 illustrates a TCP header. In TCP the sender (sender host machine) constantly tests the network to see if more bandwidth is available and uses the loss of a packet determined by sequence numbers of TCP packets as an indication to decrease its rate. Any lost packets are sent again so that there is a reliable flow of traffic. The loss of many packets can cause the TCP connection to reduce its bandwidth too much or even to enter the timed out state.

According to one embodiment of the invention, the transport access points (TAPs) use TCP for the TIP traffic flows which need to compete for bandwidth. One or more customer traffic between two access points is encapsulated in a TIP packet with both an TIP header and a TCP header. The TIP header includes TIP source and destination addresses. By doing this, a flow of TIP packets can be treated as one TCP flow between two access points, containing one or more customer traffic.

By using the inherent capability of TCP to probe the network for a higher rate while adapting to share available bandwidth with other flows, it is possible to get high utilisation of the network bandwidth without extreme packet loss (a few percent is typical). The TCP trunk of the embodiment would experience packet loss as it competes for bandwidth but since TCP resends all lost packets, all packets would ultimately arrive at the destination. It is therefore equivalent to a lossless pipe so that the higher layer traffic protocols are not impacted adversely. The re-use of TCP allows for dynamic competition for available bandwidth, adaptation of the flow rates to suit the network loading and reliable delivery of all information.

Figure 8:
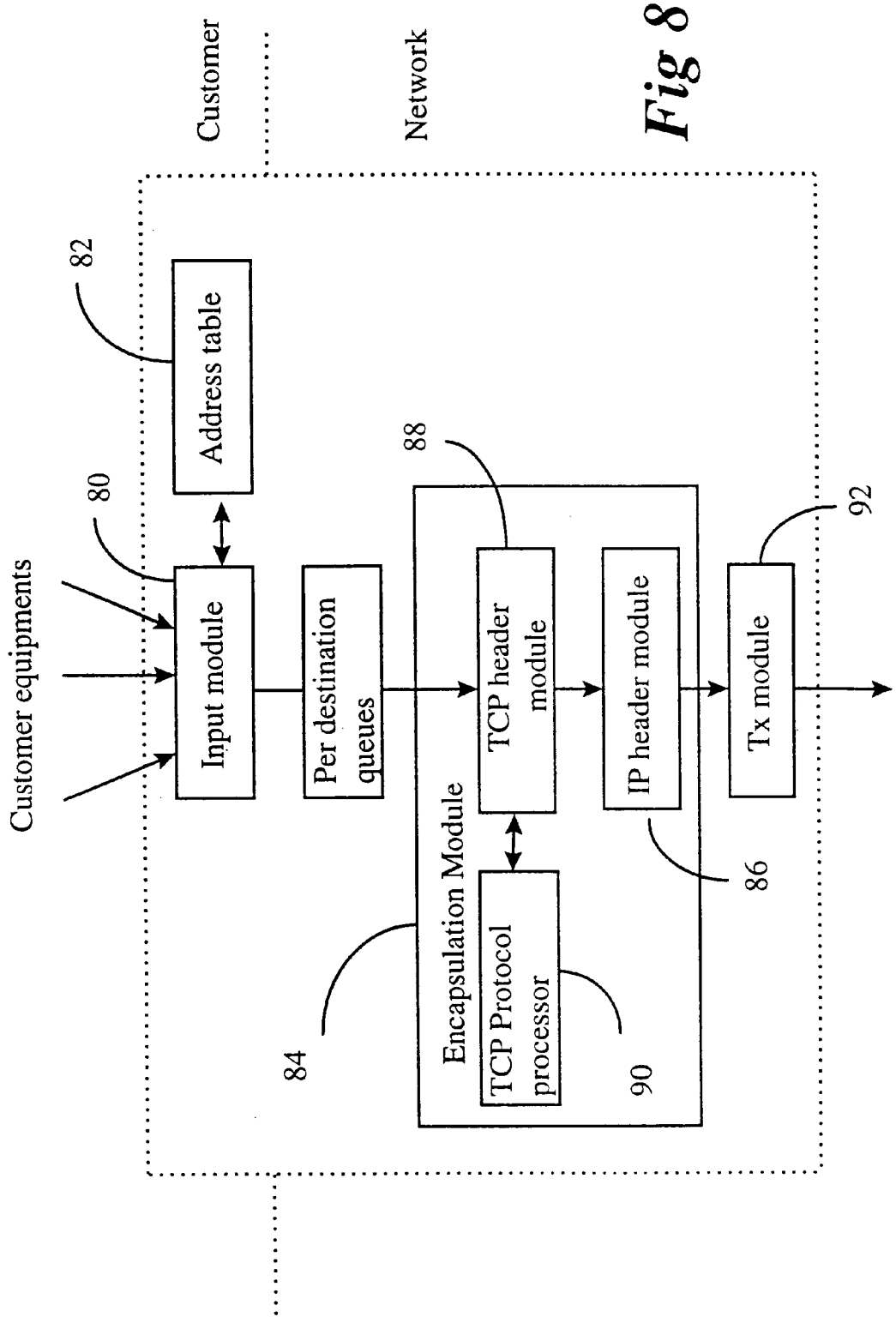
FIG. 8 is a schematical illustration of an interface module according to one embodiment of the invention.

Referring to FIG. 8, an interface module at TAP is shown. In the Figure, an input module 80 receives customer digital data flows and it identifies those that are directed to a destination transport access point, by referring to an address table 82. An encapsulation module 84 encapsulates those digital data flows so identified in a series of TCP segments and with a help of an IP header module 86 attaches to each transport IP packet a transport IP header, containing the address of the destination transport access point. Those digital data flows are contained in the data field of a transport IP packet with proper demarcation among the digital data flows. The data field also contains a TCP header generated by a TCP header module 88. A TCP protocol processor 90 runs TCP protocol using all the relevant fields of the TCP header. A transmission module 92 emits a series of completed transport IP packets into the packet transport network which by reading the destination address properly routes the packets to the appropriate destination transport access point. And, of course, the reverse process is performed at the receiver.

An admission process can limit the number of TCP connections over a TCP trunk, and also the number of other TCP connections which may compete with the TCP trunk on shared network resources. This will assure some guaranteed minimum bandwidth for the TCP trunk, and thus each of the TCP connections over the TCP trunk. TCP control will allow the TCP trunk and the TCP connections it carries to use more than their guaranteed bandwidths when extra bandwidth is available.

Future transport systems will have to cope with spreading traffic over multiple physical links because total traffic between two points is higher than available serial technology. This can cause packet mis-ordering and very bad performance for the client/server connection. Using TCP provides for inherent reordering of the transport stream and permits load spreading without this adverse effect. TCP performance can be very badly affected by inadequate buffer space at the congestion points. The aggregation of flows into one TCP trunk reduces the total number of flows seen by the transport network. This in turn permits the use of much less buffer space and more intelligent discard policies to further improve network performance.

The essence of the TCP protocol is the adaptation of the rate to allow elastic sharing and the retransmission to provide reliable delivery. However, since in the novel IP based packet transport system both ends of the trunk are owned and well understood by the network operator, it is possible to modify TCP to facilitate better performance, resulting in more assured and improved quality of service to customers.

It is required that the transport system provides some minimum level of bandwidth for the total traffic between any pair of access points. Usually TCP will reduce its transmission rate very aggressively when a packet is lost. If the guaranteed minimum bandwidth is known and the round trip time (RTT) between the access points is known or has been calculated, then the TCP sender node need only reduce its window to that which corresponds to a sending rate equal to that configured minimum rate. In this way the protocol will still probe for extra, opportunistic bandwidth but will be able to maintain the configured minimum. The access point would again do the accounting and ensure that, when there was traffic to send, it was able to achieve the promised minimum.

Accounting at the access point would use a moving average over some window of time. At any time when the average rate achieved is less than the allocated minimum, the access point would mark the packets with a higher delivery priority. For traffic sent opportunistically after the minimum is met the packets would be marked as lower priority for delivery and therefore discardable. If the allocations of bandwidth over the network are done conservatively then the higher priority packets should rarely be discarded. The TOS field in the IP header provides for an indication to "maximize reliability".

Since the access point has control over which packets are marked as discardable it can bias loss toward less fragile connections and maintain a more fair sharing between different flows. It can also use this control to allocate guaranteed bandwidth to preferred classes within the total traffic. Keeping the complexity of QoS management at the edges of the network and having simple mechanisms within the network is consistent with the scalable networks and with the trends in the internet world.

As mentioned earlier, since both ends (access points) of the transport link are owned and well understood, it is possible to reduce the overhead of the encapsulation by modifying the IP and TCP headers to remove unnecessary information, thus resulting in more efficient utilization of the bandwidth. For example, some control packets will not be needed, e.g., connection set-up, connection tear-down packets etc. The TCP window size can also be extended in order to allow faster transmission over paths with long delay.

What we claim as our invention is:

1. A packet transport network for efficiently transferring customer digital data between two of a plurality of transport access interfaces in a series of transport packets comprising:

a plurality of routing nodes, each having a routing table, for routing the transport packets through routing links;

wherein each of the transport access interfaces has an address table correlating destination of the customer digital data composed of a plurality of digital data flows with an address of a destination transport access interface for connecting one or more customer terminals through a customer access line on one side and to a routing node through a routing link on the other; and wherein each of the transport access interfaces has an encapsulating module for encapsulating/decapsulating between the plurality of digital data flows identified above on the customer access line and the series of transport packets having a transmission control protocol (TCP) header on the routing links, the encapsulating module including a TCP processor for at least administering an admission process regulating the transport packets, a TCP header module for assigning the TCP header to more than one of the plurality of digital data flows, and a transport internet protocol (TIP) header module for assigning a TIP header to each TCP header and corresponding more than one of the plurality of digital data flows.

2. The packet transport network for efficiently transferring customer digital data, according to claim 1 wherein each of the transport access interfaces further comprises a TCP protocol module for performing TCP protocol with one of the remaining transport access interfaces when exchanging customer digital data with it.

3. The packet transport network for efficiently transferring customer digital data, according to claim 1 wherein each of the transport access interfaces further comprises an address resolution module for performing address resolution protocols.

4. The packet transport network for efficiently transferring customer digital data, according to claim 1 wherein each of the transport access interfaces further comprises a dynamic host configuration protocol server connected to a transport routing node for storing and managing addresses of the transport access interfaces.

5. The packet transport network for efficiently transferring customer digital data, according to claim 1, wherein the digital data flows are IP packets and each includes an IP header.

6. The packet transport network for efficiently transferring customer digital data, according to claim 3, wherein the digital data flows are IP packets and each includes an IP header.

7. The packe transport network for efficiently transferring customer digital data, according to claim 4, wherein the digital data flows are IP packets and each includes an IP header.

8. The packet transport network for efficiently transferring customer digital data, according to claim 2, wherein the digital data flows are either frame relay packets or Ethernet packets, each of which includes either a frame relay header or an Ethernet header.

9. An interface for transferring efficiently a plurality of customer digital data flows through a packet based transport network from a source transport access point to a destination transport access point comprising:

an input module for identifying a plurality of incoming customer digital data flows which are destined to the destination transport access point;

an address table containing addresses of one or more destination transport access points;

an encapsulation module for encapsulating the plurality of incoming customer digital data flows into a stream of transport packets, each transport packet having its own transmission control protocol (TCP) header and transport internet protocol (TIP) header, the latter which identifies the destination transport access point, the encapsulating module including a TCP processor for at least administering an admission process regulating the stream of transport packets, a TCP header module for assigning the TCP header to more than one of the plurality of incoming customer digital data flows, and a transport internet protocol (TIP) header module for assigning a TIP header to each TCP header and corresponding more than one of the plurality of incoming customer digital data flows; and a transmitter for transmitting the stream of transport packets to the packet based transport network.

10. The interface according to claim 9 wherein the admission process includes dynamic competition for available bandwidth and adaptation of the flow rates to suit the network loading.

11. The interface according to claim 10 wherein the TCP processor includes means for performing a sliding window flow control mechanism, in that the window size is reduced in relation to the guaranteed minimum bandwidth when congestion is detected.

12. The interface according to claim 10 wherein the TCP processor includes means for performing a sliding window flow control mechanism, in that the connection between the source and destination transport access points uses an extended window size for data exchange.

13. The interface according to claim 11 wherein the incoming customer digital data flows arc IP packets and each includes an IP header.

14. The interface according to claim 1 wherein the incoming customer digital data flows are IP packets and each includes an IP header.

15. The interface according to claim 11, wherein the incoming customer digital data flows are either frame relay packets or Ethernet packets, each of which includes either a frame relay header or an Ethernet header.

16. The interface according to claim 12, wherein the incoming customer digital data flows are either frame relay packets or Ethernet packets, each of which includes either a frame relay header or an Ethernet header.

17. In a transport network having at least two transport interface modules, each of which is connected to a plurality of customer equipments, a method of efficiently transferring digital data flows, comprising the steps of:

receiving at a source transport access interface module a plurality of digital data flows from the plurality of customer equipments;

identifying those digital data flows which are destined to a destination transport access interface module;

encapsulating, via an encapsulating module, the plurality of identified digital data flows in one transport packet stream addressed to the destination transport access interface module, the encapsulating module including a transmission control protocol (TCP) processor for at least administering an admission process regulating the transport packet stream;

assigning, via a TCP header module, a TCP header within each transport packet stream, the TCP header corresponding to more than one of the digital data flows; and assigning, via a transfer internet protocol (TIP) header module, a TIP header corresponding to each TCP header and related more than one of the digital data flows before sending each transport packet through the packet transport network.

18. The method of efficiently transferring digital data flows according to claim 17, comprising a further step of running TCP protocol on the stream of transport packets between the source and destination transport access interface modules.

19. The method of efficiently transferring digital data flows according to claim 18, wherein the step of running TCP protocol includes a further step of performing sliding window flow control mechanism in that the window size is reduced in relation to the guaranteed minimum bandwidth when congestion is detected.

20. The method of efficiently transferring digital data flows according to claim 18, wherein the step of running TCP protocol includes further steps of performing sliding window flow control mechanism and exchanging data between the source and destination transport access interface modules through a connection having an extended window size.

21. The method of efficiently transferring digital data flows according to claim 18, wherein the step of running TCP protocol includes further steps of performing modified TCP protocol in that certain TCP protocol functions are alleviated by agreement between the source and destination transport access interface modules.

22. The method of efficiently transferring digital data flows according to claim 18, wherein the one or more digital data flows from one or more customer equipments are one or more flows of customer packets and the step of encapsulating includes a step of encapsulating one or more customer packets into one transport packet stream addressed to said destination transport access interface module.

23. The method according to claim 19 wherein the digital data flows are IP packets and each includes an IP header.

24. The method according to claim 20 wherein the digital data flows are IP packets and each includes an IP header.

25. The method according to claim 21 wherein the digital data flows are IP packets and each includes an IP header.

26. The method according to claim 22 wherein the customer packets are IP packets and each includes an IP header.

27. The method according to claim 19, wherein the digital data flows are either frame relay packets or Ethernet packets, each of which includes either a frame relay header or an Ethernet header.

28. The method according to claim 20, wherein the digital data flows are either frame relay packets or Ethernet packets, each of which includes either a frame relay header or an Ethernet header.

29. The method according to claim 21, wherein the digital data flows are either frame relay packets or Ethernet packets, each of which includes either a frame relay header or an Ethernet header.

30. The method according to claim 22, wherein the customer packets are either frame relay packets or Ethernet packets, each of which includes either a frame relay header or an Ethernet header.

31. In a transport network having at least two transport interface modules, each of which is connected to one or more customer equipments, a method of efficiently transferring digital data flows, comprising the steps of:

receiving at a source transport access interface module one or more digital data flows from one or more customer equipments;

identifying those digital data flows which are destined to a destination transport access interface module;

encapsulating, via an encapsulating module, the one or more digital data flows in one transport packet stream addressed to the destination transport access interface module, the encapsulating module including a transmission control protocol (TCP) processor for at least administering an admission process regulating the transport packet stream;

assigning, via a TCP header module, a TCP header within each transport packet stream, the TCP header corresponding to more than one of the digital data flows; and assigning, via a transfer internet protocol (TIP) header module, a TIP header corresponding to each TCP header and related more than one of the digital data flows before sending each transport packet trough the packet transport network;

running TCP protocol on the stream of transport packets between the source and destination transport access interface modules; and wherein the step of running TCP protocol includes further steps of performing simplified TCP protocol by modifying the IP and TCP headers by agreement between the source and destination transport access interface modules.

32. The method according to claim 31 wherein the digital data flows are IP packets and each includes an IP header.

33. The method according to 31 wherein the digital data flows are either frame relay packets or Ethernet packets, each of which includes either a frame relay header or an Ethernet header.

* * * * *